US006852255B2

(12) United States Patent
Yang et al.

(10) Patent No.: US 6,852,255 B2
(45) Date of Patent: Feb. 8, 2005

(54) METHOD FOR PRODUCING WATER-INSOLUBLE POLYSACCHARIDES

(75) Inventors: Jean-Dean Yang, TaoYuan (TW);
Shiao-Wen Tsai, KaoHsiung (TW);
Jui-Hsiang Chen, Hsinchu (TW);
Chiung-Lin Yang, Taipei (TW);
Yu-Lin Hsieh, KaoHsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 263 days.

(21) Appl. No.: 10/040,352

(22) Filed: Jan. 9, 2002

(65) Prior Publication Data

US 2003/0094719 A1 May 22, 2003

(30) Foreign Application Priority Data

May 2, 2001 (TW) ........................................ 90110451 A

(51) Int. Cl.[7] ................................................. B29B 9/00
(52) U.S. Cl. ................................ 264/5; 264/28; 264/41; 264/86; 264/186; 264/233; 264/234; 264/236; 264/330; 536/123.1; 536/124
(58) Field of Search ................................ 264/5, 28, 41, 264/86, 186, 233, 234, 236, 330; 536/123.1, 124

(56) References Cited

U.S. PATENT DOCUMENTS 4,963,666 A * 10/1990 Malson ...................... 536/55.1

FOREIGN PATENT DOCUMENTS

| JP | 61000017 A | * | 1/1986 |
| JP | 05140201 A | * | 6/1993 |

* cited by examiner

*Primary Examiner*—Leo B. Tentoni
(74) *Attorney, Agent, or Firm*—Thomas, Kayden, Horstemeyer & Risley

(57) ABSTRACT

This invention is concerned with a method for producing water-insoluble polysaccharides. A method for making the water-insoluble bio-compatible gel includes activating the hydroxyl-containing polysaccharides with the activating agent to form activated polysaccharides, and cross-linking the activated polysaccharides, under moderate conditions producing different shapes of the water-insoluble bio-compatible gel. The water-insoluble bio-compatible gels, films, porosities, powders, sheets, fibers and spheres of this invention may be applied to various medical and cosmetic uses.

68 Claims, No Drawings

METHOD FOR PRODUCING WATER-INSOLUBLE POLYSACCHARIDES

BACKGROUND OF THE INVENTION

1. Field of Invention

This invention relates generally to a simple method for producing water-insoluble polysaccharides, and in particular, to the water-insoluble bio-compatible gels, films, porosity, sheets, fibers and spheres of this invention may be applied to various medical and cosmetic uses.

2. Description of the Related Art

Hyaluronic acid ("HA") is a naturally occur mucopolysaccharide found for example, in synovial fluid, in vitreous humor, in capsules of some bacteria, in blood vessel and umbilical cord, and in other connective tissues. The polysaccharide consists of alternating N-acetyl-D-glucosamine and D-glucuronic acid residues joined by alternating beta. 1-3 glucuronic and beta. 1-4 glucosaminidic bonds, so that the repeating unit is-(1. fwdarw. 4)-. beta. -D-GlcA-(1. fwdarw. 3)-. beta. -D-GlcNAc-. In water, hyaluronic acid dissolves to form a highly viscous fluid. The molecular weight of hyaluronic acid isolated from natural sources generally falls within the range of several thousands to several millions daltons.

HA has been recently applied in the highly molecular of medicine. Generally, it has been reported that HA has functions of (1) naturally occurring in body, (2) no immunoreaction (3) degradation and adsorption by human body, (4) mass production and others.

HA, in chemically modified ("derivative") form, is useful as a surgical aid, to prevent adhesions of body tissues during the post-operation period.

The derivative HA gel or film is injected into locus between the tissues that are to be kept separate to inhibit their mutual adhesion. To be effective the gel must remain in place and prevent tissue contact for a long enough time so that when the gel finally disperses and the tissues do Chemically modified HA can also be useful for controlled release drug delivery, wound heading, anti-adhesion and comestibles.

Tomihata et al., 1997, Biomaterials, Vol.18, page 189–195, describes the preparation of cross-linked hyaluronic acid films of low water content by using the sodium salt of HA (with an average molecular weight of $1.5 \times 10^6$) and poly (ethylene glycol) diglycycidyl ether (EX-810) that as a cross-linker of HA.

They studied the effect of HA films cross-linked with EX-810 at different pH. The HA powder was dissolved in double distilled water of the pH of the HA solution by addition of 0.1N HCl and 0.1N NaOH, EX-810 was added to the solution and mixed under stirring at room temperature. The resulting solution was cast into a petri dish and allowed to dry under atmospheric pressure at 25° C. for 5 days to yield cross-linked HA film of 20 um thickness. Experimental results showed that the optimal pH of the cross-linking solution was at pH 6.1.

Malson, 1990, U.S. Pat. No. 4,963,666, states a process for producing the carboxyl-containing polysaceharides. A polysaceharide containing carboxyl group is reacted with a bi or poly-functional epoxide in an alkaline reagent. The cross-linking is performed during drying. Malson described the 200 mg of sodium hyaluronate MW $3 \times 10^6$ were mixed with 6 ml of 0.5% NaOH in a plastic tube and stirred with a glass rod until a clear homogeneous solution has been obtained. Then 2 ml of 1,4-butanediol diglycidyl ether (BDDE) were added and mixed thoroughly. The solution was subjected to shaking overnight and dialyzed against running distilled water for 24 hrs had a weakly acidic pH of about 5.5. The solution was poured into a petri dish of polystyrene and dried at room temperature for 2 days. A transparent, planar, water-insoluble film of 50 $\mu$m thickness was obtained.

Sakurai et al., 1987, U.S. Pat. No. 4,716,224, states a cross-linked hyaluronic acid and its use. In the invention, a poly-functional epoxy compound is selected from the group consisting of halomethyloxirane compounds and a bis-epoxy compound selected from the group consisting of 1,2-bis (2,3-epoxypropoxy) ethane, 1,4-bis (2,3-epoxypropoxy) butane, 1,6-bis (2,3-epoxypropoxy) hexane and a diglycidyl ether of biophenol A or bisphenol F, which has a crosslinking index of 5 to 20 per 100 repeating disaccharides composed of glucoronic acid and N-acetylglucosamine in hyaluronic acid, said cross-linked hyaluronic acid or pharmaccutically acceptable salt thereof being water soluble and stringy.

10 g of HA solution salt (a molecular weight, $7.3 \times 10^5$) were dissolved in 450 ml of 0.2N sodium hydroxide solution with cooling and the resulting solution was filtered with a 0.45 $\mu$m micro-filter. The filtrate was added to 40 ml of 10N sodium hydroxide solution and then 500 ml of ethanol and 6.0 ml of epichorohydrin with stirring. The reaction was effected at 20° C. for 24 hrs and then the reaction mixture was adjusted to pH 6.4 with acetic acid. By addition of 500 ml of ethanol, there was separated a white precipitate, which was then recovered by filtration, washed well with ethanol and dried under reduced pressure. In the other example, 2.0 g of HA sodium salt (a molecular weight, $2.0 \times 10^6$) were dissolved in 100 ml of 0.1N sodium hydroxide under cooling and 100 ml of dioxane and 4.3 g of 1,4-bis (2,3-epoxypropoxy) butane were added. Reaction was effected at 40° C. for 2 hrs. The reaction mixture were added to 200 ml of water, the resultant mixture was neutralized with 1N hydrochloric acid and then centrifuged at 300 rpm. The precipitate was washed well with a 1.0M aqueous solution of sodium chloride, and a 0.15M aqueous solution of chloride, dehydrated with ethanol and then dried. Finally, 1.7 g of the cross-linked HA was formed.

Burns et al., 1991, U.S. Pat. No. 5, 017,229, States a method for producing water insoluble derivatives of hyaluronic acid. They announced a water insoluble hyaluronic acid was abstained by using the solid content 0.4%–2.6% of hyaluronic acid and an activating agent. In the claims of this invention, the poly-anionic polysaccharides included hyaluronic acid, carboxyl methylcellulose, carboxymethylamylose, chondroitin-6-sulfate, dermatin sulfate, heparin and heparin sulfate. As the example of this invention described, sodium hyaluronate (400 mg; 1.0 mmole of carboxyl groups) having a molecular weight between $1 \times 10^6$–$2 \times 10^6$ was dissolved in 10 ml of distilled water. The pH of the aqueous solution was adjusted to pH 4.75 by addition of 0.1N HCl. Then 314 mg of (1-ethyl-3-C3-dimethylaminopropyl) carbodimide hydrochloride (EDC) was added in the HA solution. The reaction mixture was kept at room temperature for 5 hrs, after which time it had formed a thick insoluble hydroxyl gel.

Burns et al., 1996, U.S. Pat. No. 5,527,893, States a method for producing water insoluble derivatives of poly-anionic polysaccharides. As the example of the invention described, sodium hyaluronate (400 mg) was dissolved in 10 ml of distilled water. The pH of the aqueous solution was adjusted to pH 4.75 by addition of 0.1N HCl. Then 314 mg of EDC was added all at once followed by 190 mg of L-leucine methyl ether hydrochloride. The reaction mixture was kept at room temperature for 5 hrs, after which time it had formed the invention also features a method for preparing a water insoluble HA composition comprising an acyl derivative of a poly-anionic polysaccharide.

Kuo et al., 1994, U.S. Pat. No. 5,356,883, describes a method for preparing water-insoluble bio-compatible gels, films and sponges by reacting hyaluronic acid with a car-bodiimide. As the example of the invention described, a solution of HA (5.5 mg) was brought to pH 4.75 using 0.1N HCl. The, a solution of EDC (1.67 mg) was added to the HA solution. The reagents were mixed for 2 hrs at room temperature. Ethanol equal to three volumes of the reaction mixture was added to precipitate the chemically modified HA. The precipitate was separate from the solution, washed, and dried. A viscous and homogeneous solution was formed when water was added to the precipitate.

Kuo et al., 1996, U.S. Pat. No. 5,502,081, States a substance having pharmaceutical activity covalent bonded to the modified hyaluronic acid that reacted with a mono-carbodiimide.

Kuo et al., 2000, U.S. Pat. No. 6,013,679, States a method for preparing water-insoluble derivatives of hyaluronic acid by reacting hyaluronic acid with a carbodiimide.

De Belder et al., PCT publication No. WO 86/00912, describes a slowly-degradable gel, for preventing tissue adhesions following surgery, prepared by cross-linking a carboxyl-containing polysaccharide with a bi-or poly-functional epoxide. The gel has an infrared absorption frequency of carboxyl group (——COOH) of ester functional group at 1745 cm−1.400 mg of sodium hyaluronate molecular weight $3 \times 10^6$ was dissolved in 4 ml of distilled water for 2 hrs. Then 600 mg of 1,4-butanediol diglycidyl ether (BDDE) was added and admixed thoroughly. HA gel was formed after the 0.15 ml of glacial acetic acid was added and reacted at 60–70° C. for 15 hrs.

T. Malson et al., 1986, PCTP publication No. WO 86/00079, states a method for preparing viscous fluid containing a sterile and pyrogen-free gel of cross-linked hyaluronic acid by reacting hyaluronic acid with the poly-functional epoxide, halohydrin, epihalohydrin or halide.

T. Malson et al., 1990, PCT publication No. WO 90/09401, States a method for preparing a cross-linked hyaluronic acid with the phosphorous-containing reagent as a cross-linker.

T. Malson et al., 1998, U.S. Pat. No. 5,783,691, describes a cross-linked hyaluronic acid derivative in which the cross-linking has been achieved by means of reaction with a phosphorous-containing reagent, especially a derivative of an acid of phosphorus (V).

T. Malson et al., 1987, U.S. Pat. No. 4,716,154, States a method for preparing a vitreous humor substitute intended for ophthalmological uses and consisting of a gel of cross-linked hyaluronic acid. The major characteristic of the invention was that used the poly-functional epoxide, halohydrin, epihalohydrin or halide as a cross-linker of hyaluronic acid. As the example of invention described.

Only the dry solid content of HA solution was over 13.3% and cross-linked temperature was over 50° C., the cross-linked hyaluronic acid gels could be formed in a plastic tube.

Nobuhiko et al., 1993, Journal of Controlled Release, Vol 25, page 133–143, describes a method for preparing lipid microspheres-containing hyaluronic acid gels. The 20% dry solids content of the hyaluronic acid was dissolved in 1N NaOH solution. Then, the cross-linked HA gel was formed after the PGPGE (Polyglycerol Polyglycidyl Ether) epoxide that contained one molar ratio of repeating unit was added in the HA solution and mixed under stirring at 60° C. for 15 min.

Nobuhiko et al., 1992, Journal of Controlled Release, Vol 22, page 105–106, describes a method for preparing cross-linked hyaluronic acid gels. The 20% dry solid content of the hyaluronic acid was dissolved in 1N NaOH solution. Then, the cross-linked hyaluronic acid gel was formed after the EGDGE (Ethylene Glycol Diglycidyl Ether) or PGPGE that dissolved in the alcohol solution was added in the HA solution and mixed under stirring at 60° C. for 15 min.

Balazs et al., 1986, U.S. Pat. No. 4,582,865, states a method for preparing cross-linked gels of hyaluronic acid and products containing such gels. The major characteristic of the invention was that a mixture of sodium hyaluronate and other hydrophilic polymer in a dilute aqueous alkaline solution at a pH of not less than about 9 was cross-linked with divinly sulfone at about 20° C.

Hamilton et al., 1990, U.S. Pat. No. 4,937,279, states a method for preparating water insoluble derivatives of hyaluronic acid with EDG and L-leucine metyhy ester chloride.

Miller et al., 1998, U.S. Pat. No. 5,760,200, states a method for preparation water insoluble derivatived of poly-anionic polysaccharides. The cross-linking reaction of hyaluronic acid, EDC and L-leucine methyl ester chloride was carried out in an acidic solution.

Alginate is a polysaccharide gel that extracted from the sargassum. The alginate polysaccharide consists of 1,4-linked β-D-mannuronic acid (M) and 1,4-linked α-L-guluronic acid (G).

Thompson et al., 1996, U.S. Pat. No. 5,563,186, states a method for preparing cross-linked alginate-based gels for matrix conformance. A composition of matter for matrix conformance formed from an aqueous solution of an alginate polysaccharide and a method of forming an alginate polysaccharide gel are disclosed. A Group hA cation, a dialdehyde, or a diamine may be used to cross-link the resulting alginate gel.

Desai et al., 1994, U.S. Pat. No. 5,334,640, states a method for preparing ionic covalent cross-linked and cross-linking bio-compatible encapsulation compositions and methods. PEG diacrylate (PEG-DA) was added to a solution of sodium alginate, and then a photocross-linked alginate was formed while this solution was exposed to visible radiation or UV light radiation.

Patrick et al., 1998, U.S. Pat. No. 5,705,270, states a method for preparing micro-capsules prepared from cross-linking polysaccharides. One example of the invention was described as following: Sodium alginate was dried in a vacuum oven. The dry powder was suspended in dichloromethane dried, a two fold excess of acryloyl chloride and triethyl amine was added to remove HCl upon formation. The reaction was carried in round bottomed flask under argon with constant reflux for 24 hours. The reaction mixture was filtered to remove the alginate acrylate, and then the substituted alginate was washed twice with ethanol and dried in a vacuum. The substituted alginate was formed a photocross-linked alginate micro-capsule by emulsification technique and UV light radiation.

Iguchi et al., 1998, U.S. Pat. No. 5,811,531, states a method for preparing absorbent with stability against salts and process for production thereof. 100 parts of xanthan gum was placed in mixer and stirred with 4 parts of the aqueous of the cross-linking agent obtained by adding of ethylene glycol diglycidyl ether to the methanol solution. The obtained mixture was heated at 140° C. for 20 minutes to form the absorbent. The absorbent was obtained using sodium alginate, pectin, and guar gum in the same procedure as above described. G. Hamdi et al., 1998, Journal of controlled release, Vol 55. page 193–201, states an original method for study in vitro the enzymatic degradation of cross-linked starch micro-spheres. The aqueous phase was prepared by dissolving soluble starch in a 2M sodium hydroxide solution under mechanical stirring. The aqueous phase was pre-emulsified in a cyclohexane-chloroform mixture (4:1, v/v) containing 0.5 %(v/v) of sorbitane monooleate. This emulsion was then added under mechanical agitation at 600 rpm. The reaction was maintained at 40° C. for 18 hours. Micro-spheres were then isolated by centrifugation and washed with cyclohexane, extensively with deionized water and finally with ethanol 95%(v/v).

Chitin is the most abundant organic matter is mainly found in the outer shell at crustacea, cartilage, exoskeleton of insect and all wall of fungi. Chitin is a naturally occurring linear high molecular polysaccharide compound of alternating disaccharide units of N-acetyl-D-glucosamine and glucosamine jointed by β-1,4 bond. Chitin consists of about 2000–3000 monomers, having a molecular weight of approximately two millions, depending on the conditions of making and sources.

Chitosan was obtained from the deacetylation by using the thermal alkaline. Chitin and chitosan are naturally high molecular compounds, with good bio-compatible, biodegradation and almost nontoxin (Dose of lethal, $LD_{50}=16$ g/Kg). Besides the different applications on the food industries, the anti-microbial effect of chitosan can be also applied to the encapsulating and pharmaceutics.

The used chitosan is low impart to the environment has one or more other beneficial properties such as bio-compatible and biodegradation, which make them suitable for many applications, such as the encapsulating materials, agricultural use, biomedical materials and pharmaceutics for a wide variety of use.

Unger et al., 1996, U.S. Pat. No. 5,525,710, states a method for preparing highly porous chitosan bodies. Chitosan flakes were dissolved in a solution of dilute acetic acid, and the viscous solution was centrifuged to remove air bubbles. The gel was then made by contacting the viscous hydrocolloid with a solution of sodium hyroxide for 24 hours. The gel was then sliced and immersed into the toluene solution, and cross-linked with 2,4-TDI. The cross-linked product was then dried in a vacuum oven, and ground to a powder, which contained highly pore volume of the cross-linked chitosan.

Roy et al., 1998, U.S. Pat. No. 5,770,712, state a method for preparing cross-linked hydrogel beads from chitosan. An aqueous suspension of chitosan beads were immersed in the 100% absolute alcohol, then 1,4-butanediol diglycidyl ether was added in the solution and mixed under stirring for 24 hours at room temperature. The unreacted terminal epoxide was removed by alcohol solvent. Chitosan beads were spread in the water solution, and then the diethylamino (DEA) was added in the solution and mixed under stirring for 16 hours at room temperature.

Chondroitin sulfate was extracted from the cartilage of cattle and fish. Chondroitin sulfate is the component of connective tissue, and also named as glycosaminoglycan, or galactosamino glucuronoglycan sulfate which is one of the biggest structures molecular in the body. Chondroitin sulfate is a high molecular polysaccharide composed of N-acetyl-D-glucosamine and glucuronic acid. Chondroitin sulfate can adsorb the water and nutrient source, like as a buffer, that avoids the cartilage to destroy early.

Sakurai et al., 1989, U.S. Pat. No. 4, 863,907, states a method for preparing cross-linked glycosaminoglycans and their use. As the example of the invention described, to a mixture of a 12.5% solution of ChS——C sodium salt and a 0.75N aqueous solution of NaOH was added 1 volume of ethanol under stirring and the resultant sticky precipitate was separated and recovered. This sticky precipitaye was added to the epichiorohydrin, the resulting mixture was kneaded well and then it was allowed to stand at 20° C. for 24 hours. The ChS——C sodium salt was synthesized in the reaction.

Matsuda et al., 1995, U.S. Pat. No. 5, 462,976, states a method for preparing photocurable glycosaminoglycan derivatives, cross-linked glycosaminoglycans and method of production. Anhydrous pyridine was added to a solution of hyaluronic acid tri-n-butylamine salt in dimethylformamide (DMF), followed by addition of cinnamoyl chloride with vigorous stirring at room temperature. Esterification was allowed to proceed at 75° C. for 2 hours, then ethanol saturated with sodium acetate was added to the reaction mixture, the resulting precipitate was collected and thoroughly washed with ethanol, then the film formed was exposed to irradiation of 270 nm wavelength. Thus was obtained a cross-linked hyaluronic acid film.

SUMMARY OF THE INVENTION

It is therefore an objective of the present invention to provide a simple method for producing water-insoluble polysaccharides. In order to achieve the above purpose, the invention comprises the steps of (a) preparing a hydroxyl-containing polysaccharide solution. In preferred embodiments of the aspect of the invention, the hydroxyl-containing polysaccharide which are used include hyaluronic acid, carboxylmethylcellulose, starch, alginate, chondroitin-4-sulfate, chondroitin-6-sulfate, xanthane gum, chitosan, pectin, agar, carrageenan or guar gum thereof; (b) adjusting a moderate pH range of polysaccharide containing hydroxyl groups solution. The preferred pH for carring out the reaction is 3.0 to 11; (c) cross-linking the hydroxyl-containing polysaccharide solution by adding the polyfunctional epoxy compounds. The preferred embodiments of this aspect of the invention, the poly-functional epoxy compounds which are used include 1,4-butanediol diglycidyl ether (BDDE), ethylene glycol diglycidyl ether (EGDGE), 1,6-hexanediol diglycigyl ether, polyethylene glycol diglycidyl ether, polypropylene glycol diglycidyl ether, polytetramethylene glycol digylcidyl ether, neopentyl glycol digylcidyl ether, polyglycerol polyglycidyl ether, diglycerol polyglycidyl ether, glycerol polyglycidyl ether, tri-methylolpropane polyglycidyl ether, pentaerythritol polyglycidyl ether and sorbitol polyglycidyl ether thereof; (d) producing different shapes of the water-insoluble polysaccharide by shape procedure.

Other features and advantages of the invention will be apparent from the following description of the preferred embodiments thereof, and from the claims.

DESCRIPTION OF THE PREFERRED EMBODIMENTS

This invention is concerned with a method for producing water-insoluble polysaccharides, comprising the steps of:

(a) preparing a hydroxyl-containing polysaccharide solution.

(b) adjusting a moderate pH range of polysaccharide containing hydroxyl groups solution.

(c) cross-linking the hydroxyl-containing polysaccharide solution by adding the poly-functional epoxy compound.

(d) producing different shapes of the water-insoluble polysaccharide by taking shape procedure.

The preferred dry solid content of hydroxyl-containing polysaccharide in the reaction is 0.2% to 10%. The hydroxyl-containing polysaccharide is chosen from hyaluronic acid, carboxylmethyl cellulose, starch, alginate, chondroitin-4-sulfate, chondroitin-6-sulfate, xanthane gum, chitosan, pectin, agar, carrageenan or guar gum. The hydroxyl-containing polysaccharides that can cross-link with the epoxide are all included in this invention. They are not construed to be limiting the scope of this invention.

Above (b) is carried out at pH of 2 to 11, but more preferably between pH 2.5 and 7.5.

The pH of solution is adjusted by addition of HCl solution or NaOH solution.

Above (C) the molar equivalent ratio of said polyfunctional epoxy compound to said hydroxyl-containing polysaccharide is in a range of between 0.1 and 8.0, but more preferred molar equivalent ratio of said polyfunctional epoxy compound to said hydroxyl-containing polysaccharide is in a range of between 0.2 to 6.0.

The di-functional, tri-functional and four functional epoxy compounds are all suitable in this invention. For instance, polyfunctional epoxy compound is chosen 1,4-butanediol diglycidyl ether (BDDE), ethylene glycol diglycidyl ether (EGDGE), 1,6-hexanediol diglycigyl ether, polyethylene glycol diglycidyl ether, polypropylene glycol diglycidyl ether, polytetramethylene glycol digylcidyl ether, neopentyl glycol digylcidyl ether, polyglycerol polyglycidyl ether, diglycerol polyglycidyl ether, glycerol polyglycidyl ether, tri-methylolpropane polyglycidyl ether, pentaerythritol polyglycidyl ether and sorbitol polyglycidyl ether.

The poly-functional epoxy compound that are suitable for reaction in this invention, they are not constructed to be limiting the scope of this invention.

Above step (c) the cross-linking reaction is carried out at 10° C. to 60° C. for 12 min to 12 hours, but more preferably the cross-linking reaction is carried out at 20° C. to 50° C. for 30 min to 12 hours. The cross-linking of temperature and time can be adjusted according to the different conditions.

As above (d) described, the different shapes of the water-insoluble polysaccharide are carried out by the different procedure of taking shape. In general, the cross-linked polysaccharide solution is cast into a mold and allows drying to yield a film of water-insoluble polysaccharide. The material of mold can be made up with the ceramic, metal or polymer. The preferred temperature of drying is between 25° C. to 70° C.

The cross-linking polysaccharide solution is cast into a mold and allows to freeze-dry to yield a porosity of water-insoluble polysaccharide, or a organic solvent or the cross-linked polysaccharide is continual pressed into the coagulant of organic solvent by a squeezed apparatus, and allows to produce water-insoluble polysaccharide, or the cross-linked polysaccharide is intermittent squeezed into the coagulant of organic solvent and allows to yield a sphere of water-insoluble polysaccharide.

The temperature of coagulant solution is at 5° C. to 60° C., but more preferably is at 10° C. to 50° C.

The coagulant solution comprises water and organic solvent. The weight fraction of organic solvent is between 60% and 100%, but more preferably between 75% and 100%.

The organic solvent of coagulant is chosen from 1,4-dioxane, chloroform, methylene chloride, N, N-dimethylformamide (DMF), N, N-dimethylacetamide (DMAc), ethyl acetate, acetone, methyl ethyl ketone (MEK), methanol, ethanol, propanol, isopropanol and butanol.

The film, porosity, powder, sheet, fiber and sphere of water-insoluble polysaccharides may be used as various medical and cosmetic uses after washing with water/organic solution, distilled water and drying under vacuum, and the organic solvent is chosen from acetone, methyl ethyl ketone (MEK), methanol, ethanol, propanol, isopropanol, butanol or the mixture of each organic solvent.

The weight fraction of organic solvent is between 50% and 100%, and the ketones and alcohol can be mixed with any ratio. The temperature of washing solution is between 15° C. and 50° C., then the different shapes of water-insoluble polysaccharides are further dried by hot air drying, radiation heating drying or vacuum drying, but preferred temperature of dryer is below 60° C.

A number of examples will be set forth below in order to illustrate the invention without limiting the invention in any way.

DETAILED DESCRIPTION OF THE INVENTION

The invention is described in more detail in the following examples. These examples are giving by way of illustration and are not intended to limit the invention except as set forth in the claims.

EXAMPLE 1

The Preparation of Water-insoluble of the Cross-linked HA Polysaccharide

Sodium hyaluronate (100 mg; 1 molar equivalent of hydroxyl group) was dissolved in 10 ml of distilled water. The 1% dry solid content of HA solution was formed under stirring at room temperature. Next, adjustment of the pH of the HA solution was performed by addition of 1.0 N NaOH or 1.0N HCl. These results are showed in the following table (1A).

Then EGDGE (448 mg; 4 molar equivalent of hydroxyl groups) was added in the HA solution and mixed under stirring at 35° C. for 30 min or 1 hr. The resulting solution was cast into a mold of Teflon plate and allowed to dry under oven at 35° C. to yield cross-linked HA films. After removal from the mold of Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results are summarized in the table 1B).

Table 1B results showed that the films obtained from the cross-linking reaction of HA solution and EGDGE epoxide at a pH of 3.7 to 7.5 for more 0.5 hr were strong and insoluble in 0.02M PBS solution during a 24 hrs period.

TABLE 1B

| Sample sets in 0.02M MPBS solu at 25° C., 24 hrs | (1A1) in-soluble | (1B1) in-soluble | (1C1) in soluble | (1D1) soluble | (1E1) soluble | (1F1) soluble |
|---|---|---|---|---|---|---|
| Sample sets in 0.02M MPBS solu at 25° C., 24 hrs | (1A2) in-soluble | (1B2) in-soluble | (1C2) in-soluble | (1D2) soluble | (1E2) soluble | (1F2) soluble |
| Sample sets in 0.02M MPBS solu at 25° C., 24 hrs. | — | — | — | — | (1F3) soluble | (1G3) soluble |
| Sample sets in 0.02M MPBS solu at 25° C., 24 hrs | — | — | — | — | (1F4) soluble | (1F4) soluble |

EXAMPLE 2

The Preparation of Water-insoluble of the Cross-linked HA Polysaccharide

Sodium hyaluronate (100 mg; 1 molar equivalent of hydroxyl group) was dissolved in 10 ml of distilled water. The 1% dry solid content of HA solution was formed under stirring at room temperature. Next, adjustment of the pH of the HA solution was performed by addition of 1.0 N NaOH or 1.0N HCl. These results were showed in the following table 2. Then BODGE (224 mg; 2 molar equivalent of hydroxyl group) was added in the HA solution and mixed under stirring at 30° C. for 4 hrs. The different pH at the cross-linked HA solution were adjusted to pH 6.5–7.5 by addition of 1.00N NaOH or 1.0N HCl.

The resulting solution was cast into a mold of Teflon plate and allowed to dry under oven at 30° C. for 12 hrs to yield cross-linked HA films. After removal from the mold of

TABLE 1A

| Sample | 1A | 1B | 1C | 1D | 1E | 1F |
|---|---|---|---|---|---|---|
| Sodium hyaluronate (g) | 0.1 | 0.1 | 0.1 | 0.1 | 0.1 | 0.1 |
| HA hydroxyl (mq) | 1 | 1 | 1 | 1 | 1 | 1 |
| Sodium hyaluronate (Wt %) | 1 | 1 | 1 | 1 | 1 | 1 |
|  | 3.0 ± 0.2 | 3.5 ± 0.2 | 7.5 ± 0.2 | 10.0 ± 0.2 | 11.5 ± 0.2 | 12.5 ± 0.2 |
| EGDGE (g) | 0.448 | 0.448 | 0.448 | 0.448 | 0.448 | 0.448 |
| EGDGE (meq) | 4 | 4 | 4 | 4 | 4 | 4 |
| HAcrosslinked temp (° C./min) (Sample No) | 35/30 (1A1) | 35/30 (1B1) | 35/30 (1C1) | 35/30 (1D1) | 35/30 (1E1) | 35/30 (1F1) |
| HA crosslinked temp (° C./hr) (Sample No) | 35/1 (1A2) | 35/1 (1B2) | 35/1 (1C2) | 35/1 (1D2) | 35/1 (1E2) | 35/1 (1F2) |
| HA crosslinked temp (° C./hr) (Sample No) | — | — | — | — | 35/2 (1F3) | 35/2 (1G3) |
| HA crosslinked temp (° C./hr) (Sample No) | — | — | — | — | 35/24 (1F4) | 35/24 (1F4) |

Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results were summarized in the table 2).

Table 2 results showed that the films obtained from the cross-linking reaction of HA solution and EGDGE epoxide at a pH of 2.5 to 7.1 for 4 hrs were strong and insoluble in 0.02M PBS solution during a 48 hrs period.

The results of DSC (Differential Scanning Colorimetry) analysis illustrated that the major melting point of the uncross-linked HA is 166° C. ($Tm_2$). It is evident from the table 2 that the effect of cross-linking reaction of HA solution at a pH of 2.5 and 7.1 (sample 21A, 21B) were better than the pH at 10.2 and 12.6 (sample 21E, 21F). At the pH 10.2 or 12.6 of reactants a weak gel was obtained, which with lower melting point than the uncross-linked HA film, and collapsed to a fluid after 48 hrs.

TABLE 2

| Sample | 21A | 21B | 21C | 21D | 21E | 21F |
|---|---|---|---|---|---|---|
| HA hydroxyl (meq) | — | 1 | 1 | 1 | 1 | 1 | 1 |
| HA pH | — | 2.5 ± 0.2 | 3.3 ± 0.2 | 4.5 ± 0.2 | 7.1 ± 0.2 | 10.2 ± 0.2 | 12.6 ± 0.2 |
| EGDGE (g) | — | 0.224 | 0.224 | 0.224 | 0.224 | 0.224 | 0.224 |
| EGDGE (meq) | — | 2 | 2 | 2 | 2 | 2 | 2 |
| Crosslinked temp (° C.)/hr | — | 30/4 | 30/4 | 30/4 | 30/4 | 30/4 | 30/4 |
| Dry/time | — | 30/12 | 30/12 | 30/12 | 30/12 | 30/12 | 30/12 |
| Sample sets 37° C., 0.02M PBS, 48 hr | instant | insoluble | insoluble | insoluble | insoluble | 24 hrs soluble | instant |
| DSC: $Tm_2$° C. | 166 | 185 | 184 | — | 173 | 159 | 138 |

EXAMPLE 3

The Preparation of Water-insoluble of the Cross-linked HA Polysaccharide

Sodium hyaluronate (100 mg; 1 molar equivalent of hydroxyl group) was dissolved in 10. ml of distilled water. The 1% dry solid content of HA solution was formed under stirring at room temperature. Next, adjustment of the pH of the HA solution was performed by addition of 1.0 N NaOH or 1.0N HCl. These results were showed in the following table 3.

Then EGDGE (672 mg; 6 molar equivalent of hydroxyl groups) was added in the HA solution and mixed under stirring at 35° C. for 4 hrs. The different pH of the cross-linked HA solution were adjusted to pH 6.5–7.5 by 1.0N NaOH or 1.0N HCl. The resulting solution was cast into a mold of Teflon plate and allowed to dry under oven at 35° C. for 12 hrs to yield cross-linked HA films. After removal from the mold of Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results are summarized in the table 3).

Table 3 results showed that the films obtained from the cross-linking reaction of HA solution and EGDGE epoxide at a pH of 3.3 to 7.4 for 4 hrs were strong and insoluble in 0.02M PBS solution during a 72 hrs period.

The results of DSC analysis illustrated that the melting point of cross-linking reaction of HA solution at a pH 3.3 to Teflon plate and washing with 80 wt/% acetone solution and distilled water, the films were further dried under oven at 35° 7.4 (sample 3A, 3B, 3C) was higher than the uncross-linked HA film.

TABLE 3

| Sample | Uncrosslink HA film | 3A | 3B | 3C | 3D | 3E |
|---|---|---|---|---|---|---|
| Sodium HA (g) | — | 0.1 | 0.1 | 0.1 | 0.1 | 0.1 |
| Sodium HA hydroxyl (meq) | — | 1 | 1 | 1 | 1 | 1 |
| Sodium HA wt % | — | 1 | 1 | 1 | 1 | 1 |
| HA pH | — | 3.3 ± 0.2 | 4.5 ± 0.2 | 7.4 ± 0.2 | 10.5 ± 0.2 | 12.8 ± 0.2 |
| EGDGE (g) | — | 0.672 | 0.672 | 0.672 | 0.672 | 0.672 |
| EGDGE (meq) | — | 6 | 6 | 6 | 6 | 6 |
| HA crosslinked temp/time (° C.)/(hr) | — | 35/4 | 35/4 | 35/4 | 35/4 | 35/4 |
| Sample sets 25° C., 0.02M PBS 72 hr | instant | insoluble | insoluble | insoluble | 24 hrs soluble | instant |
| DSC: $Tm_2$ ° C. | 170 | 187 | 181 | 175 | 158 | — |

EXAMPLE 4

The Preparation of Water-insoluble of the Cross-linked Alginate Polysaccharide

Sodium alginate (200 mg; 2 molar equivalent of hydroxyl group) was dissolved in 20 ml of distilled water. The 1% dry solid content of sodium alginate solution was formed under stirring at room temperature. Next, adjustment of the pH of the HA solution was performed by addition of 1.0 N NaOH or 1.0N HCl.

These results were showed in the following table 4. Then EGDGE (224 mg; 2 molar equivalent of hydroxyl groups) was added in the sodium alginate solution and mixed under stirring at 35° C. for 4 hrs. The resulting solution was cast into a mold of Teflon plate and allowed to dry under oven at 35° C. to yield cross-linked sodium alginate films. After removal from the mold of Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results were summarized in the table 4).

Table 4 results showed that the films obtained from the cross-linking reaction of sodium alginate solution and EGDGE epoxide at a pH of 3.8 to 7.2 for 4 hrs were strong and insoluble in 0.02M PBS solution during a 48 hrs period.

EXAMPLE 5

The Preparation of Water-insoluble of the Cross-linked chondroitin-6-sulfate Polysaccharide Chondroitin-6-sulfate (503 mg; 3 molar equivalent of hydroxyl group) was dissolved in 10 ml of distilled water. The 5% dry solid content of chondroitin-6-sulfate solution was formed under stirring at room temperature. Next, adjustment of the pH of the chondroitin-6-sulfate solution was performed by addition of 1.0 N NaOH or 1.0N HCl. These results were showed in the following table 5.

Then EGDGE (336 mg; 3 molar equivalent of hydroxyl groups) was added in the chondroitin-6-sulfate solution and mixed under stirring at 35° C. for 4 hrs. The resulting solution was cast into a mold of Teflon plate and allowed to dry under oven at 35° C. to yield cross-linked chondroitin-6-sulfate films. After removal from the mold of Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results were summarized in the table 5).

Table 5 results showed that the films obtained from the cross-linking reaction of chondroitin-6-sulfate solution and EGDGE epoxide at a pH of 3.7 to 7.0 for 4 hrs were strong and insoluble in 0.02M PBS solution during a 48hrs period.

TABLE 4

| Sample | Uncrosslink alginate | 4A | 4B | 4C | 4D | 4E |
|---|---|---|---|---|---|---|
| Sodium alginate(g) | — | 0.2 | 0.2 | 0.2 | 0.2 | 0.2 |
| Sodium alginate hydroxyl (meq) | — | 2 | 2 | 2 | 2 | 2 |
| Alginate wt % | — | 1 | 1 | 1 | 1 | 1 |
| Alginate pH | — | 3.8 ± 0.2 | 5.0 ± 0.2 | 7.2 ± 0.2 | 10.2 ± 0.2 | 12.2 ± 0.2 |
| EGDGE (g) | — | 0.224 | 0.224 | 0.224 | 0.224 | 0.224 |
| EGDGE (meq) | — | 2 | 2 | 2 | 2 | 2 |
| crosslinked temp (° C.)/min | — | 35/4 hr | 35/4 hr | 35/4 hr | 35/4 hr | 35/4 hr |
| Sample sets 25° C., 0.02M PBS | instant | 2 days insoluble | 2 days insoluble | 2 days insoluble | instant | instant |

TABLE 5

| Sample | Uncrosslink Chondroitin-6-sulfate | 5A | 5B | 5B | 5C | 5C |
|---|---|---|---|---|---|---|
| Chondroitin-6-sulfate (g) | — | 0.503 | 0.503 | 0.503 | 0.503 | 0.503 |
| Chondroitin-6-sulfate hydroxyl (meq) | — | 3 | 3 | 3 | 3 | 3 |
| Chondroitin-6-sulfate wt % | — | 5 | 5 | 5 | 5 | 5 |
| Chondroitin-6-sulfate pH | — | 3.7 ± 0.2 | 5.5 ± 0.2 | 7.2 ± 0.2 | 9.5 ± 0.2 | 12.2 ± 0.2 |
| EGDGE (g) | — | 0.336 | 0.336 | 0.336 | 0.336 | 0.336 |
| EGDGE (meq) | — | 3 | 3 | 3 | 3 | 3 |
| Crosslinked temp/time ° C./hr | — | 35° C. *4 hr | 35° C. *4 hr | 35° C. *4 hr | 35° C. *4 hr | 35° C. *4 hr |
| Sample sets 25° C., 0.02M PBS | instant | 2 days insoluble | 2 days insoluble | 2 days insoluble | instant | instant |

EXAMPLE 6

The Preparation of Water-insoluble of the Cross-linked Pectin Polysaccharide Pectin (352 mg; 4 molar equivalent of hydroxyl group) was dissolved in 17.6 ml of distilled water. The 2% dry solid content of pectin solution was formed under stirring at room temperature. Next, adjustment of the pH of the pectin solution was performed by addition of 1.0 N NaOH or 1.0N HCl. These results were showed in the following table 6.

Then EGDGE (448 mg; 4 molar equivalent of hydroxyl groups) was added in the pectin solution and mixed under stirring at 35° C. for 4 hrs. The resulting solution was cast into a mold of Teflon plate and allowed to dry under oven at 35° C. to yield cross-linked pectin films. After removal from the mold of Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results were summarized in the table 6).

Table 6 results showed that the films obtained from the cross-linking reaction of pectin solution and EGDGE epoxide at a pH of 2.9 to 7.5 for 4hrs were strong and insoluble in 0.02M PBS solution during a 72 hrs period.

EXAMPLE 7

The Preparation of Water-insoluble of the Cross-linked Alginate Polysaccharide Sodium alginate (100 mg; 1 molar equivalent of hydroxyl group) was dissolved in 10 ml of distilled water. The 1% dry solid content of sodium alginate solution was formed under stirring at room temperature. Next, adjustment of the pH of the sodium alginate solution was performed by addition of 1.0 N NaOH or 1.0N HCl.

These results were showed in the following table 7. Then different content of EGDGE (448 mg; 4 molar equivalent of hydroxyl groups) was added in the sodium alginate solution and mixed under stirring at 35° C. for 24 hrs. The resulting solution was cast into a mold of Teflon plate and allowed to dry under oven at 35° C. to yield cross-linked sodium alginate films. After removal from the mold of Teflon plate and washing with 80 wt/% acetone solution and distilled water, the films were further dried under oven at 40° C. The cross-linked films were immersed in 0.02M phosphate buffer saline (PBS) solution for the degradation test of cross-linked films. (The results were summarized in the table 7).

Table 7 results showed that the films obtained from the cross-linking reaction of EGDGE epoxide and sodium algi-

TABLE 6

| Sample | Uncrosslink Pectin film | 6A | 6B | 6C | 6D | 6E |
|---|---|---|---|---|---|---|
| Pectin (g) | 0.352 | 0.352 | 0.352 | 0.352 | 0.352 | 0.352 |
| Pectin hydroxyl (meq) | — | 4 | 4 | 4 | 4 | 4 |
| Pectin wt % | 2% | 2% | 2% | 2% | 2% | 2% |
| Pectin pH | — | 2.9 | 3.81 | 5.8 | 7.5 | 12.3 |
| EGDGE (g) | — | 0.448 | 0.448 | 0.448 | 0.448 | 0.448 |
| EGDGE (meq) | — | 4 | 4 | 4 | 4 | 4 |
| Crosslinked temp/time (° C.)/min (Sample No) | — | 35° C. *4 hr (PEF1A) | 35° C. *4 hr (PEF1B) | 35° C. *4 hr (PEF1C) | 35° C. 84 hr (PEF1D) | 35° C. *4 hr (PEF1E) |
| Sample sets 25° C., 0.02M PBS | soluble | 3 days insoluble | 3 days insoluble | 3 days insoluble | 3 days insoluble | 24 hrs soluble | nate solution at an above 0.2 ratio of equivalent were strong and insoluble in 0.02M PBS solution during a 24 hrs period.

TABLE 7

| Sample | Uncrosslink Alginate film | 7A | 7B | 7C | 7D | 7E |
|---|---|---|---|---|---|---|
| Alginate (g) | — | 0.1 | 0.1 | 0.1 | 0.1 | 0.1 |
| Alginate hydroxyl (meq) | — | 1 | 1 | 1 | 1 | 1 |
| Alginate wt % | — | 1 | 1 | 1 | 1 | 1 |
| Alginate pH | — | 3.5 ± 0.2 | 3.5 ± 0.2 | 3.5 ± 0.2 | 3.5 ± 0.2 | 3.5 ± 0.2 |
| EGDGE (g) | — | 0.002 | 0.011 | 0.022 | 0.112 | 0.224 |
| EGDGE (meq) | — | 0.02 | 0.1 | 0.2 | 1 | 2 |
| Crosslink temp/time (° C./min) | — | 35° C. *24 hr | 35° C. *24 hr | 35° C. *24 hr | 35° C. *24 hr | 35° C. *24 hr |
| Sample sets at 25° C. 0.02M PBS, 24 hrs | soluble | soluble | soluble | insoluble | insoluble | insoluble |

EXAMPLE 8

The Preparation of Water-insoluble of the Cross-linked Chondroitin-6-Sulfate Polysaccharide Chondroitin-6-sulfate (503 mg; 3 molar equivalent of hydroxyl group) was dissolved in 10 ml of distilled water. The 5% dry solid content of chondroitin-6-sulfate solution was formed under stirring at room temperature. Next, adjustment of the pH of the chondroitin-6-sulfate solution was performed by addition of 1.0 N NaOH or 1.0N HCl. These results were showed in the following table 8.

Then EGDGE (336 mg ; 3 molar equivalent of hydroxyl groups) was added in the chondroitin-6-sulfate solution and mixed under stirring at 35° C. for 8 hrs. The resulting solution was cast into a mold of Teflon plate and allowed to dry under oven at 35° C. to yield cross-linked chondroitin-6-sulfate films. After removal from the mold of Teflon plate and washing with 80 wt/% acetone solution and distilled water, the films were further dried under oven at 35° C. The cross-linked films were immersed in 0.02M phosphate buffer saline (PBS) solution for the degradation test of cross-linked films. (The results were summarized in the table 8).

Table 8 results showed that the films obtained from the cross-linking reaction the chondroitin-6-sulfate solution and EGDGE epoxide at a pH of 3.7 to 7.0 and dry solid content of chondroitin-6-sulfate was 0.1% were strong and insoluble in 0.02M PBS solution during 48 hrs period.

TABLE 8

| Sample | 8A | 8B | 8C | 8D | 8E |
|---|---|---|---|---|---|
| Chondroitin-6-sulfate (g) | 0.503 | 0.503 | 0.503 | 0.503 | 0.503 |
| Chondroitin-6-sulfate hydroxyl (meq) | 3 | 3 | 3 | 3 | 3 |
| Chondroitin-6-sulfate wt % | 0.05 | 0.1 | 1 | 5 | 10 |
| Crosslink Chondroitin-6-sulfate pH | 3.2 ± 0.2 | 3.2 ± 0.2 | 3.2 ± 0.2 | 3.2 ± 0.2 | 3.2 ± 0.2 |
| EGDGE (g) | 0.336 | 0.336 | 0.336 | 0.336 | 0.336 |

TABLE 8-continued

| Sample | 8A | 8B | 8C | 8D | 8E |
|---|---|---|---|---|---|
| EGDGE (meq) | 3 | 3 | 3 | 3 | 3 |
| Crosslink temp/time (° C./hr) | 35° C. *8 hr | 35° C. *8 hr | 35° C. *8 hr | 35° C. *8 hr | 35° C. *8 hr |
| Sample sets at 25° C., 0.02M PBS | instant | 2 days insoluble | 2 days insoluble | 2 days insoluble | 2 days insoluble |

EXAMPLE 9

The Preparation of Water-insoluble of the Cross-linked HA Polysaccharide

Sodium hyaluronate (100 mg; 1 molar equivalent of hydroxyl group) was dissolved in 10 ml of distilled water. The 1% dry solid content of HA solution was formed under stirring at room temperature. Next, adjustment of the pH of the HA solution was performed by addition of 1.0 N NaOH or 1.0N HCl. These results were showed in the following table 9.

Then the different kinds of polyfunctional epoxides and EGDGE (448 mg ; 4 molar equivalent of hydroxyl groups) were added in the HA solution and mixed under stirring at 30° C. for 4 hrs. All the molar equivalent ratio of epoxide compounds and HA was 1:1. Results were showed as table 9 described. The resulting solution was cast into a mold of Teflon plate and allowed to dry under oven at 35° C. to yield cross-linked HA films. After removal from the mold of Teflon plate and washing with 70 wt/% acetone solution and distilled water, the films were further dried under oven at 35° C. The cross-linked films were immersed in 0.02M phosphate buffer saline (PBS) solution for the degradation test of cross-linked films. (The results were summarized in the table 9).

Table 9 results showed that the films obtained from the cross-linking reaction of HA solution with the different kinds of polyfunctional epoxides were strong and insoluble in 0.02M PBS solution during a 24 hrs period.

TABLE 9

| Sample | 9A | 9B | 9C | 9D | 9E | 9F |
|---|---|---|---|---|---|---|
| Sodium HA (g) | 0.1 | 0.1 | 0.1 | 0.1 | 0.1 | 0.1 |
| Sodium HA hydroxyl (meq) | 1 | 1 | 1 | 1 | 1 | 1 |
| Sodium HA wt % | 1 | 1 | 1 | 1 | 1 | 1 |
| Crosslink HA pH | 3.3 ± 0.2 | 3.3 ± 0.2 | 3.3 ± 0.2 | 7.3 ± 0.2 | 3.3 ± 0.2 | 6.5 ± 0.2 |
| BDDE g/meq | 0.101/1 | — | — | — | — | — |
| EGDGE g/meq | — | 0.112/1 | — | — | — | — |
| EX-861 g/meq | — | — | 0.587/1 | 0.587/1 | — | — |
| EX-411 g/meq | — | — | — | — | 0.231/1 | 0.231/1 |
| Crosslink temp/time (° C./hrs) | 30/4 | 30/4 | 30/4 | 30/4 | 30/4 | 30/4 |
| Sample sets at 25° C., 0.02M PBS 24 hrs | insoluble | insoluble | insoluble | insoluble | insoluble | insoluble |

EXAMPLE 10

The Preparation of Water-insoluble of the Cross-linked HA Polysaccharide

Sodium hyaluronate (100 mg; 1 molar equivalent of hydroxyl group) was dissolved in 10 ml of distilled water. The 1% dry solid content of HA solution was formed under stirring at room temperature. Next, adjustment of the pH of the HA solution was performed by addition of 1.0 N NaOH or 1.0N HCl. These results were showed in the following table 10.

Then EGDGE (220 mg; 2 molar equivalent of hydroxyl groups) was added in the HA solution and mixed under stirring at the different temperature for 6 hrs. All the molar equivalent ratio of epoxide compound and hydroxyl groups of HA was 2:1. Results were showed as table 10 described. The resulting solution was cast into a mold of Teflon plate and allowed to dry under oven at 35° C. to yield cross-linked HA films. After removal from the mold of Teflon plate and washing with 60 wt/% acetone solution and distilled water, the films were further dried under oven at 35° C. The cross-linked films were immersed in 0.02M phosphate buffer saline (PBS) solution for the degradation test of cross-linked films. (The results were summarized in the table 10).

Table 10 results showed that the films obtained from the cross-linking reaction of HA solution and EGDGE epoxide at a temperature of 20° C. to 45° C. for 6 hrs were strong and insoluble in 0.02M PBS solution during a 72 hrs period.

TABLE 10

| Sample | 10A | 10B | 10C | 10D | 10E | 10F |
|---|---|---|---|---|---|---|
| Sodium HA (g) | 0.1 | 0.1 | 0.1 | 0.1 | 0.1 | 0.1 |
| Sodium HA Hydroxyl (meq) | 1 | 1 | 1 | 1 | 1 | 1 |
| Sodium HA wt % | 1 | 1 | 1 | 1 | 1 | 1 |
| Crosslink HA pH | 3.5 ± 0.2 | 6.5 ± 0.2 | 3.3 ± 0.2 | 7.3 ± 0.2 | 3.1 ± 0.2 | 7.3 ± 0.2 |
| EGDGE (g) | 0.22 | 0.22 | 0.22 | 0.22 | 0.22 | 0.22 |
| EGDGE (meq) | 2 | 2 | 2 | 2 | 2 | 2 |
| Crosslink temp/time (° C./hr) | 20° C. *6 hr | 20° C. *6 hr | 35° C. *6 hr | 35° C. *6 hr | 45° C. *6 hr | 45° C. *6 hr |
| Sample sets at 37° C., 0.02M PBS | 3 days insoluble | 3 days insoluble | 3 days insoluble | 3 days insoluble | 3 days insoluble | 3 days insoluble |

EXAMPLE 11

The Preparation Cross-linked Sodium Alginate Porosity by Freeze-Drying

Powder of the sodium alginate was dissolved in the distilled water. The 1%, 2% and 3% dry solids content of sodium alginate were formed under stirred at 50° C. to 60° C. The pH of the sodium alginate solution was adjusted to pH 4 by addition of 1.0N HCl. Then the constant weight of EGDGE was added in the sodium alginate solution and mixed under stirring at 35° C. for 6 hrs.

All the molar equivalent ratio of epoxide compound and hydroxyl groups of sodium alginate was 1:1. The resulting solution was cast into a mold and produced a porosity of the cross-linked polysaccharide by freeze-drying. After removal from the mold and washing with 80 wt % acetone solution and distilled water, the porosity of the cross-linked polysaccharide was further dried and immersed in 0.02M phosphate buffer saline (PBS) solution for the degradation test.

Table 11 results showed that the porosity of the cross-linked sodium alginate was strong and insoluble in 0.02M PBS solution during a 24 hrs period.

TABLE 11

| Sample | 11A | 11B | 11C | 11D | 11E | 11F |
|---|---|---|---|---|---|---|
| Sodium alginate wt % | 1 | 1 | 2 | 2 | 3 | 3 |
| Sodium alginate pH | 3.5 ± 0.2 | 6.5 ± 0.2 | 3.3 ± 0.2 | 7.3 ± 0.2 | 3.1 ± 0.2 | 7.3 ± 0.2 |
| Sample sets at 37° C., 0.02M PBS | 24 hr insoluble | 24 hr insoluble | 24 hr insoluble | 24 hr insoluble | 24 hr insoluble | 24 hr insoluble |

EXAMPLE 12

The Preparation Cross-linked HA Porosity by Freeze-drying

Powder of the sodium hyaluronate was dissolved in the distilled water. The 1%, 2% and 3% dry solids content of sodium hyaluronate were formed under stirred at room temperature. The pH of the sodium hyaluronate solution was adjusted to pH 4.5 by addition of 1.0N HCl. Then the constant weight of EGDGE was added in the sodium hyaluronate solution and mixed under stirring at 35° C. for 6 hrs.

All the molar equivalent ratio of epoxide compound and hydroxyl groups of sodium hyaluronate was 1:1. The resulting solution was cast into a mold and produced a porosity of the cross-linked polysaccharide by freeze-drying. After removal from the mold and washing with 80 wt % acetone solution and distilled water, the porosity of the cross-linked polysaccharide was further dried and immersed in 0.02M phosphate buffer saline (PBS) solution for the degradation test.

Table 12 results showed that the porosity of the cross-linked sodium hyaluronate was strong and insoluble in 0.02M PBS solution during a 24 hrs period.

EXAMPLE 13

The Preparation Cross-linked Condroitin-4sulfte Porosity by Freeze-drying

Powder of the chondroitin-4-sulfate was dissolved in the distilled water. The 5% and 10% dry solids content of chondroitin-4-sulfate were formed under stirred at room temperature. The pH of the chondroitin-4-sulfate solution was adjusted to pH 4 by addition of 1.0N HCl. (Results were showed as table 13 describled). Then the constant weight of EGDGE was added in the chondroitin-4-sulfate solution and mixed under stirring at 35° C. for 2 hrs.

All the molar equivalent ratio of epoxide compound and hydroxyl groups of chondroitin-4-sulfate was 4:1. The resulting solution was cast into a mold and produced a porosity of the cross-linked polysaccharide by freeze-drying. After removal from the mold and washing with 80 wt % acetone solution and distilled water, the porosity of the cross-linked polysaccharide was further dried and immersed in 0.02M phosphate buffer saline (PBS) solution for the degradation test.

Table 13 results showed that the porosity of the cross-linked chondroitin-4-sulfate was strong and insoluble in 0.02M PBS solution during a 24 hrs period.

TABLE 12

| Sample | 12A | 12B | 12C | 12D | 12E | 12F |
|---|---|---|---|---|---|---|
| HA wt % | 1 | 1 | 2 | 2 | 3 | 3 |
| HA pH | 3.5 ± 0.2 | 6.5 ± 0.2 | 3.3 ± 0.2 | 7.3 ± 0.2 | 3.1 ± 0.2 | 7.5 ± 0.2 |
| Sample sets at 37° C., 0.02M PBS | 24 hr insoluble | 24 hr insoluble | 24 hr insoluble | 24 hr insoluble | 24 hr insoluble | 24 hr insoluble |

TABLE 13

| Sample | 13A | 13B | 13C | 13D | 13E | 13F |
|---|---|---|---|---|---|---|
| chondroitin-4-sulfate wt % | 5 | 5 | 5 | 10 | 10 | 10 |
| chondroitin-4-sulfate PH | 2.5 ± 0.2 | 4.6 ± 0.2 | 6.5 ± 0.2 | 2.4 ± 0.2 | 3.9 ± 0.2 | 6.3 ± 0.2 |
| Sample sets at 37° C., 0.02M PBS | 24 hr insoluble | 24 hr insoluble | 24 hr insoluble | 24 hr insoluble | 24 hr insoluble | 24 hr insoluble |

EXAMPLE 14

The Preparation of the Water-insoluble and Cross-linked Sodium Alginate Fiber

Powder of the sodium alginate (100 mg; 1 meq of the hydroxyl groups) was dissolved in 10 ml distilled water. The 1% dry solids content of sodium alginate were formed under stirring at 50–60° C. The pH of the sodium alginate solution was adjusted to pH 4 by addition of 1.0N HCl. Then the constant weight of EGDGE was added in the sodium alginate solution and mixed under stirring at 35° C. for 6 hrs.

All the molar equivalent ratio of epoxide compound and hydroxyl groups of sodium alginate was 1:2.

The resulting solution was pressed as a monofilament fiber of 50 um–1 mm diameter by using the different size of syringe in a 95% alcohol solution.

The fiber of sodium alginate that cross-linked by epoxide compound was strong and insoluble in 0.02M PBS solution during a 48 hrs period.

EXAMPLE 15

The Preparation Cross-linked Pectin Fiber

Powder of the pectin (352 mg; 4 meq of the hydroxyl groups) was dissolved in the 17.6 ml distilled water. The 2% dry solid content of pectin were formed under stirred at room temperature. The pH of the pectin solution was adjusted to pH 3.5 by addition of 1.0N NaOH or 1.0N HCl. Then the constant weight of EGDGE was added in the pectin solution and mixed under stirring at 35° C. for 6 hr. All the meq ratio of epoxide compound and hydroxyl groups of pectin was 2:1.

The resulting solution was pressed as a monofilament fiber of 50 um–1 mm diameter by using the different size of syringe in a 95% alcohol solution.

The fiber of pectin that cross-linked by epoxy compound was strong and insoluble in 0.02M PBS solution during a 48 hr period.

EXAMPLE 16A

The Dissolubility Test of Polysaccharide Film with the Organic Solvent

Powder of the hydruronate (200 mg; molecular weight $1.4 \times 10^6$) was dissolved in 10 ml of distilled water. The 2% dry solids content of HA solution was formed under stirring at room temperature.

The resulting solution was cast into a mold of Teflon plate and allowed to dry under oven at 35° C. to yield HA films, and then immersed in the different organic solvent. The pH of the organic solvent was adjusted to pH 3.0 by adding 1.0N HCl solution. These results are showed in the table 16A.

Table 16A results showed that the polysaccharide films were strong and insoluble at above 60/40 ratio of organic solvent/water solution.

TABLE (16A)

| HA form | Film | Film | Film | Film | Film | Film |
|---|---|---|---|---|---|---|
| Acetone/H$_2$O (wt %) | 40/60 soluble | 50/50 soluble | 60/40 insoluble | 70/30 insoluble | 80/20 insoluble | 0/10 nsoluble |
| Ethanol/H$_2$O (Wt %) | 40/60 soluble | 50/50 soluble | 60/40 insoluble | 70/30 insoluble | 80/20 insoluble | 90/10 nsoluble |
| Isopropanol/H$_2$O (wt %) | 40/60 soluble | 50/50 soluble | 60/40 insoluble | 70/30 insoluble | 80/20 insoluble | 90/10 insoluble |
| DMF/H$_2$O (Wt %) | 40/60 soluble | 50/50 soluble | 60/40 insoluble | 70/30 insoluble | 80/20 insoluble | 90/10 insoluble |

The alginate films were obtained from the same procedure as described above.

The films were also immersed in the organic solvent for the dissolubility test. These results are showed in the table 16(b).

Table 16(b) results showed that the alginate films were strong and insoluble at above 40/60 ratio of organic solvent/water solution.

The chondroitin-6-sulfate films were obtained from the same procedure as described above.

TABLE (16B)

| Sodium Alginate form | Film | Film | Film | Film | Film | Film |
|---|---|---|---|---|---|---|
| Acetone/H$_2$O (wt %) | 40/60 insoluble | 50/50 insoluble | 60/40 insoluble | 70/30 insoluble | 80/20 insoluble | 0/10 nsoluble |
| Ethanol/H$_2$O (Wt %) | 40/60 insoluble | 50/50 insoluble | 60/40 insoluble | 70/30 insoluble | 80/20 insoluble | 90/10 insoluble |
| Isopropanol/H$_2$O (wt %) | 40/60 insoluble | 50/50 insoluble | 60/40 insoluble | 70/30 insoluble | 80/20 insoluble | 90/10 insoluble |

The films were also immersed in the organic solvent for the dissolubility test. These results are showed in the table 16(c).

Table 16(c) results showed that the chondroitin-6-sulfate films were strong and insoluble at above 70/30 ratio of acetone/water solution.

TABLE (16C)

| Chondrotin-6-sulfate form | Film | Film | Film | Film | Film | Film |
|---|---|---|---|---|---|---|
| Acetone/H$_2$O (wt %) | 40/60 soluble | 50/50 soluble | 60/40 soluble | 70/30 insoluble | 80/20 insoluble | 0/10 nsoluble |

The pectin film was obtained from the same procedure as described above. The films were also immersed in the organic solvent for the dissolubility test. These results are showed in the table (d) results showed that the pectin films were strong and insoluble at above 40/60 ratio of acetone/water solution.

The carboxymethyl cellulose films were obtained from the same procedure as described above.

The films were also immersed in the organic solvent for the dissolubility test. These results are showed in the table 16(e).

Table 16(e) results showed that the carboxymethyl cellulose films were strong and insoluble at above 40/60 ratio of acetone/water solution.

TABLE (16E)

| CMC form | Film | Film | Film | Film | Film | Film |
|---|---|---|---|---|---|---|
| Acetone/H$_2$O (wt %) | 40/60 soluble | 50/50 soluble | 60/40 soluble | 70/30 insoluble | 80/20 insoluble | 0/10 nsoluble |

EXAMPLE (17)

The Degradation Test of Polysaccharide Film at the Different pH and Time of Cross-linking Powder of the hydruronate (200 mg; molecular weight 1.4×10$^6$) was dissolved in 10 ml of distilled water. The 2% dry solids content of HA solution was formed under stirring at room temperature. The resulting solution was cast into a mold of Teflon plate and allowed to dry under oven at 35° C. to yield cross-linked HA films were immersed in the EGDGE (ethylene glycol diglycidyl ether) containing organic solvent. The pH of the organic solvent was adjusted to pH 3.0 by 1.0N NaOH or 1.0N HCl solution. These results are showed in the table 17.

The HA films were further cross-linked at the different pH and time of cross-linking and washed with 70 wt % acetone solution, the films were dried under oven at 35° C. Then the cross-linked films were immersed in 0.15M NaCl solution for the degradation test and hyaluronidase degradation.

Table 17 results showed that the films obtained from the cross-linked reaction of HA solution and EGDGE-containing organic solvent for more 0.5 hour were strong and insoluble in the saline solution during 24 hours period.

TABLE 17

| Sample HA form | HA-A film/control | HA-B film | HA-C film | HA-D fim |
|---|---|---|---|---|
| Acetone/H$_2$O (wt %) | — | 70/30 | 70/30 | 70/30 |
| EGDGE wt % | — | 4 | 4 | 4 |
| HA pH | — | 3.0 ± 0.2 | 9.0 ± 0.2 | 11.0 ± 0.2 |
| Crosslink time (min) hyaluronidase | 30 dissoluble 30% | 30 insoluble 20% | 30 insoluble 15% | 30 insoluble 25% |
| Crosslink time (min) hyaluronidase | — | 60 insoluble 2% | 60 insoluble 16% | 60 insoluble 9.133% |

EXAMPLE 18

The Degradation Test of Polysaccharide Film at the Different Ratio of the Organic Solvent Powder of the hydruronate (200 mg; molecular weight 1.4×10$^6$) was dissolved in 10 ml of distilled water. The 2% dry solids content of HA solution was formed under stirring at room temperature. The resulting solution was cast into a mold of Teflon plate and allowed to dry under oven at 35° C. to yield cross-linked HA films were immersed in the different ratio EGDGE (ethylene glycol diglycidyl ether) solution. These results are showed in the table 18.

The pH of the cross-linked solution was adjusted to pH 3 by 1.0N HCl solution. The HA films were dried under oven at 35° C. for 1 hour and washed with 70 wt % acetone solution. Then the cross-linked films were immersed in 0.15M NaCl solution for the degradation test and hyaluronidase degradation.

Table 18 results showed that the films obtained from the cross-linked reaction of HA solution and EGDGE-containing organic solvent at above 70/30 ratio of organic solvent/water solution were strong and insoluble in the saline solution during 24 hours period.

TABLE 18

| Sample | HA-A | HA-B | HA-C | HA-D | HA-E |
|---|---|---|---|---|---|
| HA form | film/control | film | film | film | film |
| Acetone/H$_2$O wt % | 50/50 | 70/30 | 80/20 | 90/10 | 95/5 |
| EGDGE wt % | 4 | 4 | 4 | 4 | 4 |
| EGDGE pH | 3.0 ± 0.2 | 3.0 ± 0.2 | 3.0 ± 0.2 | 3.0 ± 0.2 | 3.0s ± 0.2 |
| Crosslink time (min) (0.15M NaCl, 24 hrs) | 60 soluble | 60 insoluble | 60 insoluble | 60 insoluble | 60 insoluble |

EXAMPLE 19

The Degradation Test of HA Film at the Different Weight Percent of the EGDGE

Powder of the hydruronate (200 mg; molecular weight 1.4×10$^6$) was dissolved in 10 ml of distilled water. The 2% dry solids content of HA solution was formed under stirring at room temperature. The resulting solution was cast into a mold of Teflon plate and allowed to dry under oven at 35° C. to yield cross-linked HA films were immersed in the different ratio EGDGE (ethylene glycol diglycidyl ether) solution. These results are showed in the table 19.

The pH of the cross-linked solution was adjusted to pH 3 by 1.0N HCl solution. The HA films were dried under oven at 35° C. for 1 hour and washed with 70 wt % acetone solution. Then the cross-linked films were immersed in 0.15M NaCl solution for the degradation test and hyaluronidase degradation.

Table 19 results showed that the films obtained from the cross-linked reaction of HA solution and EGDGE-containing organic solvent at above 0.2 wt % were strong and insoluble in the saline solution during 24 hours periods.

TABLE 19

| Sample | HA-A | HA-B | HA-C | HA-D | HA-E | HA-F |
| --- | --- | --- | --- | --- | --- | --- |
| HA form | film/control | film | film | film | film | film |
| Acetone/H$_2$O (wt %) | — | 70/30 | 70/30 | 70/30 | 70/30 | 70/30 |
| EGDGE 之 wt % | — | 0.2 | 0.5 | 1 | 4 | 10 |
| HA pH | — | 3.0 ± 0.2 | 3.0 ± 0.2 | 3.0 ± 0.2 | 3.0 ± 0.2 | 3.0 ± 0.2 |
| Crosslink time (min) (0.15M NaCl, 24 hrs) | — | 60 insoluble | 60 insoluble | 60 insoluble | 60 insoluble | 60 insoluble |

EXAMPLE 20

The Degradation Test of CMC at the Different pH and Weight Percent of the EGDGE

Powder of the CMC (200 mg; molecular weight 1.4×10$^6$) was dissolved in 10 ml of distilled water. The 2% dry solid content of CMC solution was formed under stirring at room temperature. The resulting solution was cast into a mold and produced a porosity of the cross-linked polysaccharide by freeze-drying. The porosity of the CMC polysaccharide was immersed in the EGDGE-containing organic solvent. The pH of the cross-linked solution was adjusted by adding 1.0N HCl or 1.0N NaOH solution. These results are showed in the table 20.

The porosity of the CMC polysaccharides were further cross-linked at the different pH and weight percent of EGDGE and washed with 70 wt % acetone solution, the porosity of the CMC polysaccharides were dried under oven at 35° C. Then the cross-linked polysaccharides were immersed in 0.15M NaCl solution for the degradation test and hyaluronidase degradation.

Table 20 results showed that the porosity of the cross-linked CMC obtained from the cross-linked reaction of CMC solution and EGDGE-containing organic solvent at pH above 3 and over 0.5 wt % epoxide for more 0.5 hour were strong and insoluble in a saline solution during 24 hours periods.

TABLE 20

| Sample | CMC-A | CMC-B | CMC-C | CMC-D | CMC-E | CMC-F |
| --- | --- | --- | --- | --- | --- | --- |
| CMC form | sponge/control | sponge | sponge | sponge | sponge | sponge |
| Acetone/H$_2$O (Wt %) | — | 70/30 | 70/30 | 70/30 | 70/30 | 70/30 |
| CMC two % | — | 0.5 | 1 | 4 | 4 | 4 |
| CMC pH | — | 3.0 ± 0.2 | 3.0 ± 0.2 | 3.0 ± 0.2 | 7.0 ± 0.2 | 11.0 ± 0.2 |
| Crosslink (min) 0.15M NaCl, 24 hrs | — | 30 insoluble | 30 insoluble | 30 insoluble | 30 insoluble | 30 insoluble |
| Crosslink (min) 0.15M NaCl, 24 hrs | — | 60 insoluble | 60 insoluble | 60 insoluble | 60 insoluble | 60 insoluble |

EXAMPLE 21

The Degradation Test of Pectin Fiber at the Different pH, Temperature and Cross-linking Time Powder of the pectin (200 mg) was dissolved in 10 ml of distilled water. The 2% dry solid content of pectin solution was formed under stirring at room temperature. The resulting solution was pressed as a monofilament fiber of 50 um~1 mm thickness by using the different size of syringe in a 95% alcohol solution. The pectin fibers were immersed in the EGDGE-containing organic solvent. The pH of the organic solvent was adjusted by adding 1.0N HCl or 1.0 N NaOH. These results are showed in the table 21.

Table 21 results showed that the pectin fiber obtained from the cross-linked reaction of pectin and EGDGE-containing organic solvent at pH above 3, over 0.2 wt % epoxide, over 25° C. and more 0.5 hour reaction were strong and insoluble in a saline solution during 24 hours periods.

TABLE 21

| Sample | Pectin-A | Pectin-B | Pectin-C | Pectin-D | Pectin-E | Pectin-F |
|---|---|---|---|---|---|---|
| Pectin form | fiber/control | fiber | fiber | fiber | fiber | fiber |
| Acetone/$H_2O$ (wt %) | — | 70/30 | 70/30 | 70/30 | 70/30 | 70/30 |
| Pectin wt % | — | 0.2 | 1 | 1 | 4 | 4 |
| Pectin pH | — | 3.0 ± 0.2 | 3.0 ± 0.2 | 5.0 ± 0.2 | 11.0 ± 0.2 | 11.0 ± 0.2 |
| Crosslink temp/time (° C./min) 0.15M NaCl, 24 hrs | soluble | 35/30 insoluble | 35/30 insoluble | 25/30 insoluble | 35/30 insoluble | 50/30 insoluble |
| Crosslink temp/time (° C./min) 0.15M NaCl, 24 hrs | — | 35/60 insoluble | 35/60 insoluble | 25/60 insoluble | 35/60 insoluble | 50/60 insoluble |

EXAMPLE 22

The Degradation Test of the Various Epoxides at the Different pH of Mixed Organic Solvent Powder of the HA (200 mg) was dissolved in 10 ml of distilled water. The 2% dry solid content of pectin solution was formed under stirring at room temperature. The resulting solution was pressed as a monofilament fiber of 50 um~1 mm thickness by using the different size of syringe in a 95% alcohol solution. The HA were immersed in the EGDGE-containing organic solvent. The pH of the organic solvent was adjusted by adding 1.0N HCl. These results are showed in the table 22.

Table 22 results showed that the HA fiber obtained from the cross-linked reaction of HA and EGDGE-containing organic solvent at pH above 3, over 1 wt % epoxide, over 25° C. and more 0.5 hour reaction were strong and insoluble in a saline solution during 24 hours periods.

TABLE 22

| Sample | HA fiber | HA fiber | HA fiber | HA fiber |
|---|---|---|---|---|
| Acetone/$H_2O$ (wt %) | 80/20 | 80/20 | 80/20 | 80/20 |
| EX-861 epoxide wt % | 0.5 | 1 | 0.5 | 1 |
| EX-313 epoxide wt % | 0.5 | 1 | 0.5 | 1 |
| EX-314 epoxide wt % | 0.5 | 1 | 0.5 | 1 |
| EX-411 epoxide wt % | 0.5 | 1 | 0.5 | 1 |
| HA pH | 3.0 ± 0.2 | 11.0 ± 0.2 | 3.0 ± 0.2 | 11.0 ± 0.2 |
| Crosslink temp/time (° C.)/(min) | 35/60 | 35/60 | 35/60 | 35/60 |
| Sample set at 35° C., 0.15 M NaCl, 24 hrs | insoluble | insoluble | insoluble | insoluble |

*EX-861 (di-epoxide) Polyethylene glycol diglycidyl ether, WPE = 587 (Nagase Company)
*EX-313 (di-epoxide) Glycerol polyglycidyl ether, WPE = 141 (Nagase Company)
*EX-314 (trii-epoxide) Glycerol polyglycidyl ether, WPE = 145 (Nagase Company)
*EX-411 (tetra-epoxide) Pentaerythritol polyglycidyl ether, WPE = 231 (Nagase Company)

EXAMPLE 23

The Degradation Test of CMC Film at the Different Cross-linked Temperature

Powder of the CMC (200 mg; molecular weight $1.4 \times 10^6$) was dissolved in 10 ml of distilled water. The 2% dry solid content of CMC solution was formed under stirring at room temperature. The resulting solution was cast into a mold and produced a porosity of the cross-linked polysaccharide by freeze-drying. The porosity of the CMC polysaccharide was immersed in the EGDGE-containing organic solvent The pH of the cross-linked solution was adjusted by adding 1.0N HCl solution. These results are showed in the table 23. The porosity of the CMC polysaccharides were further cross-linked at the different temperature, the porosity of the CMC polysaccharides was dried under oven at 35° C.

Table 23 results showed that the porosity of the CMC obtained from the cross-linked reaction of CMC solution and EGDGE-containing organic solvent at pH above 3, over 25° C. and more 0.5 hour reaction were strong and insoluble in a saline solution during 24 hours periods.

TABLE 23

| Sample | Uncrosslink CMC | 8A | 8B | 8C |
|---|---|---|---|---|
| CMC form | sponge | sponge | sponge | sponge |
| Acetone/$H_2O$ (wt %) | — | 80/20 | 80/20 | 80/20 |
| EGDGE wt % | — | 4 | 4 | 4 |
| CMC pH | — | 3.0 ± 0.2 | 3.0 ± 0.2 | 3.0 ± 0.2 |
| Crosslink temp/time (° C.)/(min) | — | 25/60 | 35/60 | 50/60 |
| Sample sets at 35° C., 0.15 M naCl, 24 hrs | soluble | insoluble | insoluble | insoluble |

We claim:

1. A method for preparing water-insoluble polysaccharides, comprising the steps of:
    (a) preparing a water solution of hydroxyl-containing polysaccharides;
    (b) adjusting a pH of the water solution of hydroxyl-containing polysaccharides to 2.5~7.5;
    (c) cross-linking the water solution of hydroxyl-containing polysaccharides by adding a poly-functional epoxy compound thereto, thereby forming a solution of cross-linked polysaccharides; and
    (d) shaping the solution of cross-linked polysaccharides into a water-insoluble polysaccharide.

2. The method as claimed in claim 1, wherein the step (d) comprises pouring the solution of cross-linked polysaccharides into a mold, and yielding a film of water-insoluble polysaccharide after drying.

3. The method as claimed in claim 1, wherein the step (d) comprises pouring the solution of cross-linked polysaccharides into a mold, and performing a freeze-drying to yield a porous water-insoluble polysaccharide.

4. The method as claimed in claim 1, wherein the step (d) comprises adding organic solvent into the solution of cross-linked polysaccharides to precipitate cross-linked polysaccharides, and producing powders or sheets of water-insoluble polysaccharide by filtering.

5. The method as claimed in claim 1, wherein the step (d) comprises squeezing the solution of cross-linked polysaccharides into a coagulant containing organic solvent to yield a fiber of water-insoluble polysaccharide.

6. The method as claimed in claim 5, wherein the step (d) comprises intermittently squeezing the solution of cross-linked polysaceharides into a coagulant containing organic solvent to yield a sphere of water-insoluble polysaccharide.

7. The method as claimed in claim 2, wherein the film of water-insoluble polysaceharide is applied in medicine or cosmetic after washing with water/organic solvent and distilled water and drying under vacuum.

8. The method as claimed in claim 3, wherein the porous water-insoluble polysaceharide is applied in medicine or cosmetic after washing with water/organic solvent and distilled water and drying under vacuum.

9. The method as claimed in claim 4, wherein the powders or sheets of water-insoluble polysaceharide is applied in medicine or cosmetic after washing with water/organic solvent and distilled water and drying under vacuum.

10. The method as claimed in claim 5, wherein the fiber of water-insoluble polysaccharide is applied in medicine or cosmetic after washing with water/organic solvent and distilled water and drying under vacuum.

11. The method as claimed in claim 6, wherein the sphere of water-insoluble polysaceharide is applied in medicine or cosmetic after washing with water/organic solvent and distilled water and drying under vacuum.

12. The method as claimed in claim 1, wherein the hydroxyl-containing polysaceharide is selected from the group consisting of hyaluronic acid, carboxylmethyl cellulose, starch, alginate, chondroitin-4-sulfate, chondroitin-6-sulfate, xanthane gum, chitosan, pectin, agar, carrageenan, and guar gum.

13. The method as claimed in claim 1, wherein, in the step (a), the hydroxyl-containing polysaccharides are dissolved in water to form a uniform water solution of hydroxyl-containing polysaccharides having a dry solid content of from 0.2 to 10% by weight.

14. The method as claimed in claim 1, wherein the poly-functional epoxy compound is selected from the group consisting of 1,4-butanediol diglycidyl ether (BDDE), ethylene glycol diglycidyl ether (EGDGE), 1,6-hexanediol diglycigyl ether, polyethylene glycol diglycidyl ether, polypropylene glycol diglycidyl ether, polytetramethylene glycol digylcidyl ether, neopentyl glycol digylcidyl ether, polyglycerol polyglycidyl ether, diglycerol polyglycidyl ether, glycerol polyglycidyl ether, tri-methylolpropane polyglycidyl ether, pentaerythritol polyglycidyl ether, and sorbitol polyglycidyl ether.

15. The method as claimed in claim 1, wherein, in the step (c), a molar equivalent ratio of the poly-functional epoxy compound to the hydroxyl-containing polysaccharide is in a range of between 0.1 and 8.0.

16. The method as claimed in claim 15, wherein the molar equivalent ratio of the poly-functional epoxy compound to the hydroxyl-containing polysaccharide is 0.2 to 6.0.

17. The method as claimed in claim 1, wherein the cross-linking is carried out at 10° C. to 60° C. for 10min to 12hrs.

18. The method as claimed in claim 2, wherein the mold comprises ceramic, metal, or polymer, and the drying has a temperature between 25° C. to 70° C.

19. The method as claimed in claim 3, wherein the solution cross-linked polysaccharides is poured into the mold having a proper shape, and a porous water-insoluble polysaccharide having an interconnective pore structure is formed by the freeze-drying.

20. The method as claimed in claim 4, wherein organic solvent is added into the solution of cross-linked polysaccharides to precipitate the cross-linked polysaccharides with stirring, and the powders or sheets of water-insoluble polysaccharide are produced by filtering.

21. The method as claimed in claim 5, wherein the solution of cross-linked polysaccharides is intermittently squeezed into the coagulant containing organic solvent by a squeezer apparatus to produce the fiber of water-insoluble polysaccharide of a thickness of 50µm~1 mm after drying.

22. The method as claimed in claim 6, wherein the solution of cross-linked polysaccharides is intermittently squeezed into the coagulant containing organic solvent to produce the sphere of water-insoluble polysaccharide of a diameter of 50µm~1 mm.

23. The method as claimed in claim 21, wherein the coagulant containing organic solvent comprises water and organic solvent, and the organic solvent has a weight fraction between 60% and 100%.

24. The method as claimed in claim 23, wherein the organic solvent is selected from the group consisting of 1, 4-dioxane, chloroform, methylene chloride, N, N-dimethylformamide (DMF), N, N-dimethylacetamide (DMAc), ethyl acetate, acetone, methyl ethyl ketone (MEK), methanol, ethanol, propanol, isopropanol, and butanol.

25. The method as claimed in claim 21, wherein the shaping is carried out at a coagulant temperature of 5° C. to 60° C.

26. The method as claimed in claim 7, wherein the film of water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

27. The method as claimed in claim 8, wherein the porous water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

28. The method as claimed in claim 9, wherein the powders or sheets of water-insoluble polysaccharide are washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

29. The method as claimed in claim 10, wherein the fiber of water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

30. The method as claimed in claim 11, wherein the sphere of water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

31. The method as claimed in claim 26, wherein the film of water-insoluble polysaccharide is dried by hot air drying, radiation heating drying, or vacuum drying with a temperature below 60° C., after the film of water-insoluble polysaceharide is washed with water/organic solvent and distilled water.

32. The method as claimed in claim 27, wherein the porous water-insoluble polysaccharide is dried by hot air drying, radiation heating drying, or vacuum drying with a temperature below 60° C., after the film of water-insoluble polysaceharide is washed with water/organic solvent and distilled water.

33. The method as claimed in claim 28, wherein the powders or sheets of water-insoluble polysaccharide are dried by hot air drying, radiation heating drying, or vacuum drying with a temperature below 60° C., after the film of water-insoluble polysaccharide is washed with water/organic solvent and distilled water.

34. The method as claimed in claim 29, wherein the fiber of water-insoluble polysaccharide is dried by hot air drying, radiation heating drying, or vacuum drying with a temperature below 60° C., after the film of water-insoluble polysaccharide is washed with water/organic solvent and distilled water.

35. The method as claimed in claim 30, wherein the sphere of water-insoluble polysaccharide is dried by hot air drying, radiation heating drying, or vacuum drying with a temperature below 60° C., after the film of water-insoluble polysaccharide is washed with water/organic solvent and distilled water.

36. A method for preparing water-insoluble polysaccharides, comprising the steps of:
 (a) preparing an organic solvent/water solution which contains an epoxy compound;
 (b) adjusting a pH of the organic solvent/water solution to 2.5~7.5;
 (c) adding shaped hydroxyl-containing polysaccharides into the pH-adjusted organic solvent/water solution; and
 (d) cross-linking the shaped hydroxyl-containing polysaccharides to form water-insoluble polysaccharides.

37. The method as claimed in claim 36, wherein the epoxy compounds in the organic solvent/water solution have a weight fraction of about 0.05~2.0%.

38. The method as claimed in claim 37, wherein the epoxy compounds in the organic solvent/water solution have a weight fraction of about 0.2~2.0%.

39. The method as claimed in claim 36, wherein the epoxy compound is selected from the group consisting of 1,4-butanediol diglycidyl ether (BDDE), ethylene glycol diglycidyl ether (EGDGE), 1,6-hexanediol diglycigyl ether, polyethylene glycol diglycidyl ether, polypropylene glycol diglycidyl ether, polytetramethylene glycol digylcidyl ether, neopentyl glycol digylcidyl ether, polyglycerol polyglycidyl ether, diglycerol polyglycidyl ether, glycerol polyglycidyl ether, tri-methylolpropane polyglycidyl ether, pentaerythritol polyglycidyl ether, sorbitol polyglycidyl ether, and combination thereof.

40. The method as claimed in claim 36, wherein the organic solvent in the organic solvent/water solution has a weight fraction of about 50~95%.

41. The method as claimed in claim 40, wherein the organic solvent in the organic solvent/water solution has a weight fraction of about 70~90%.

42. The method as claimed in claim 36, wherein organic solvent is a mixture of alcohol and acetone.

43. The method as claimed in claim 36, wherein organic solvent is selected from the group consisting of 1,4-dioxane, chloroform, methylene chloride, N, N-dimethylformamide (DMF), N, N-dimethylacetamide (DMAc), ethyl acetate, acetone, methyl ethyl ketone (MEK), methanol, ethanol, propanol, isopropanol, butanol, and combination thereof.

44. The method as claimed in claim 36, wherein the hydroxyl-containing cellulose, starch, alginate, chondroitin-4-sulfate, chondroitin-6-sulfate, xanthane gum, chitosan, pectin, agar, carrageenan, guar gum, and combination thereof.

45. The method as claimed in claim 36, wherein the shaped hydroxyl-containing polysaccharides comprise film, porosity, powder, sheet, fiber, or sphere.

46. The method as claimed in claim 36, wherein the step (c) comprises pouring the solution of hydroxyl-containing polysaccharides into a mold to form a film of polysaccharide after drying, and adding the film of polysaccharide into the pH-adjusted organic solvent/water solution.

47. The method as claimed in claim 36, wherein the step (c) comprises pouring the solution of hydroxyl-containing polysaccharides into a mold to form a porous polysaccharide by freeze-drying, and adding the porous polysaccharide into the pH-adjusted organic solvent/water solution.

48. The method as claimed in claim 36, wherein the step (c) comprises adding organic solvent into the solution of hydroxyl-containing polysaccharides to precipitate hydroxyl-containing polysaccharides, after powders or sheets of polysaceharide are formed by filtering, adding the powders or sheets of polysaccharide into the pH-adjusted organic solvent/water solution.

49. The method as claimed in claim 36, wherein the step (c) comprises intermittently squeezing the solution of hydroxyl-containing polysaccharides to form a sphere of polysaccharide, and adding the sphere of polysaccharide into the pH-adjusted organic solvent/water solution.

50. The method as claimed in claim 36, wherein the step (c) comprises squeezing the solution of hydroxyl-containing polysaccharides into a coagulant containing organic solvent to form a fiber of polysaccharide, and adding the fiber of polysaccharide into the pH-adjusted organic solvent/water solution.

51. The method as claimed in claim 50, wherein the organic solvent is selected from the group consisting of 1,4-dioxane, chloroform, methylene chloride, N, N-dimethylformamide (DMF), N, N-dimethylacetamide (DMAc), ethyl acetate, acetone, methyl ethyl ketone (MEK), methanol, ethanol, propanol, isopropanol, butanol, and combination thereof.

52. The method as claimed in claim 36, wherein the cross-linking is carried out at 10° C. to 60° C. for 0.5 hr to 12 hrs.

53. The method as claimed in claim 52, wherein the cross-linking is carried out at 25° C. to 50° C.

54. The method as claimed in claim 46, wherein the film of water-insoluble polysaccharide is applied in medicine or cosmetic after washing with water/organic solvent and distilled water and drying under vacuum.

55. The method as claimed in claim 47, wherein the porous water-insoluble polysaccharide is applied in medicine or cosmetic after washing with water/organic solvent and distilled water and drying under vacuum.

56. The method as claimed in claim 48, wherein the powders or sheets of water-insoluble polysaccharide are applied in medicine or cosmetic after washing with water/organic solvent and distilled water and drying under vacuum.

57. The method as claimed in claim 49, wherein the fiber of water-insoluble polysaccharide is applied in medicine or cosmetic after washing with water/organic solvent and distilled water and drying under vacuum.

58. The method as claimed in claim 50, wherein the sphere of water-insoluble polysaccharide is applied in medicine or cosmetic after washing with water/organic solvent and distilled water and drying under vacuum.

59. The method as claimed in claim 54, wherein the film of water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

60. The method as claimed in claim 55, wherein the porous water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

61. The method as claimed in claim 56, wherein the powders or sheets of water-insoluble polysaccharide are washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

62. The method as claimed in claim 57, wherein the fiber of water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

63. The method as claimed in claim 58, wherein the sphere of water-insoluble polysaccharide is washed with water/organic solvent and distilled water, and the water/organic solvent has a temperature between 15° C. and 50° C. and the distilled water has a temperature between 25° C. and 50° C., and the water/organic solvent comprises water and organic solvent, wherein the organic solvent is selected from the group consisting of acetone, methyl ethyl ketone (MEK), methanol, ethanol, propanol, isopropanol, butanol, and combination thereof, and the organic solvent has a weight fraction between 50% and 100%, and acetone and alcohol are mixed with any ratio.

64. The method as claimed in claim 59, wherein the film of water-insoluble polysaceharide is dried by hot air drying, radiation heating drying, or vacuum drying with a temperature below 60° C., after the film of water-insoluble polysaccharide is washed with water/organic solvent and distilled water.

65. The method as claimed in claim 60, wherein the porous water-insoluble polysaccharide is dried by hot air drying, radiation heating drying, or vacuum drying with a temperature below 60° C., after the film of water-insoluble polysaccharide is washed with water/organic solvent and distilled water.

66. The method as claimed in claim 61, wherein the powders or sheets of water-insoluble polysaccharide are dried by hot air drying, radiation heating drying, or vacuum drying with a temperature below 60° C., after the film of water-insoluble polysaccharide is washed with water/organic solvent and distilled water.

67. The method as claimed in claim 62, wherein the fiber of water-insoluble polysaccharide is dried by hot air drying, radiation heating drying, or vacuum drying with a temperature below 60° C., after the film of water-insoluble polysaccharide is washed with water/organic solvent and distilled water.

68. The method as claimed in claim 63, wherein the sphere of water-insoluble polysaccharide is dried by hot air drying, radiation heating drying, or vacuum drying with a temperature below 60° C., after the film of water-insoluble polysaccharide is washed with water/organic solvent and distilled water.

* * * * *

UNITED STATES PATENT AND TRADEMARK OFFICE
CERTIFICATE OF CORRECTION

PATENT NO. : 6,852,255 B2
DATED : February 8, 2005
INVENTOR(S) : Yang et al.

It is certified that error appears in the above-identified patent and that said Letters Patent is hereby corrected as shown below:

<u>Title page,</u>
Item [75], Inventors, should read:
-- Jean-Dean Yang, TaoYuan (TW);
  Shiao-Wen Tsai, KaoHsiung (TW);
  Jui-Hsiang Chen, Hsinchu (TW);
  Chiung-Lin Yang, Taipei (TW);
  Yu-Lin Hsieh, KaoHsiung (TW);
  Yu-Lun Huang, Tainan City (TW)
  Chu-Hui Tseng, TaoYuan City (TW) --

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,852,255 B2
DATED         : February 8, 2005
INVENTOR(S)   : Yang et al.

It is certified that error appears in the above-identified patent and that said Letters Patent is hereby corrected as shown below:

<u>Title page,</u>
Item [75], Inventors, should read:
-- Jui-Hsiang Chen, Hsinchu (TW);
  Chiung-Lin Yang, Taipei (TW);
  Shiao-Wen Tsal, KaoHsiung (TW);
  Yu-Lun Huang, Tainan City (TW);
  Chun-Hui Tseng, TaoYuan City (TW);
  Jean-Daan Yang, TaoYuan (TW);
  Yu-Lin Hsieh, KaoHsiung (TW) --.

Signed and Sealed this

Sixth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,852,255 B2 Page 1 of 1
DATED : February 8, 2005
INVENTOR(S) : Yang et al.

It is certified that error appears in the above-identified patent and that said Letters Patent is hereby corrected as shown below:

Title page,
Item [75], Inventors, should read:
-- Jui-Hslang Chen, Hsinchu (TW);
   Chlung-Lin Yang, Taipei (TW);
   Shlso-Wen Tsal, KaoHsiung (TW);
   Yu-Lun Huang, Tainan City (TW);
   Chun-Hui Tseng, TaoYuan City (TW);
   Jean-Dean Yang, TaoYuan (TW);
   Yu-Lin Hsieh, KaoHsiung (TW) --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,852,255 B2  Page 1 of 1
APPLICATION NO. : 10/040352
DATED : February 8, 2005
INVENTOR(S) : Yang et al.

It is certified that error appears in the above-identified patent and that said Letters Patent is hereby corrected as shown below:

Title Page:
Item 75, Inventors should read:
–Jui-Hsiang Chen, Hsinchu (TW);
 Chiung-Lin Yang, Taipei (TW);
 Shiao-Wen Tsai, KaoHsiung (TW);
 Yu-Lun Huang, Tainan City (TW);
 Chun-Hui Tseng, TaoYuan City (TW);
 Jean-Dean Yang, TaoYuan (TW);
 Yu-Lin Hsieh, KaoHsiung (TW)--

Signed and Sealed this

Twenty-second Day of August, 2006

JON W. DUDAS
*Director of the United States Patent and Trademark Office*